No. 741,676. PATENTED OCT. 20, 1903.
C. D. KNIGHT.
ARMATURE FOR ELECTRIC MOTORS AND GENERATORS.
APPLICATION FILED JAN. 2, 1903.
NO MODEL.
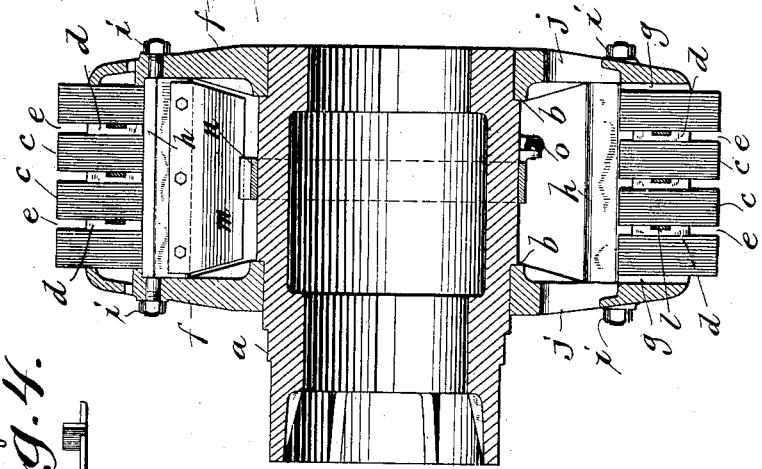
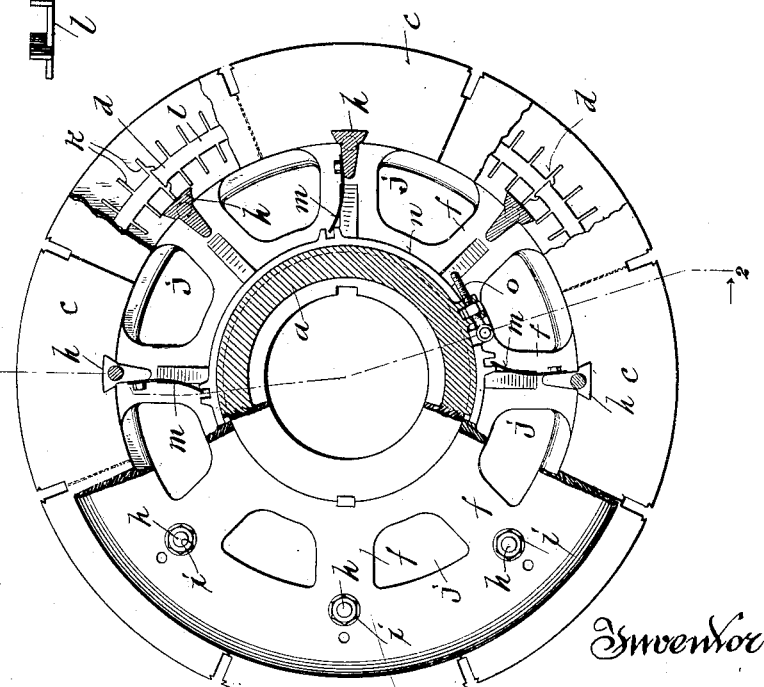
Witnesses:
Geo. W. Young.
Alice E. Goss.
Inventor:
Charles D. Knight
By Winkler Flanders Smith Bottom & Slee
Attorneys.

No. 741,676. Patented October 20, 1903.

UNITED STATES PATENT OFFICE.

CHARLES D. KNIGHT, OF MILWAUKEE, WISCONSIN, ASSIGNOR TO NATIONAL ELECTRIC COMPANY, OF MILWAUKEE, WISCONSIN, A CORPORATION OF WISCONSIN.

ARMATURE FOR ELECTRIC MOTORS AND GENERATORS.

SPECIFICATION forming part of Letters Patent No. 741,676, dated October 20, 1903.

Application filed January 2, 1903. Serial No. 137,472. (No model.)

*To all whom it may concern:*

Be it known that I, CHARLES D. KNIGHT, a citizen of the United States, residing at Milwaukee, in the county of Milwaukee and State of Wisconsin, have invented certain new and useful Improvements in Armatures for Electric Motors and Generators, of which the following is a specification, reference being had to the accompanying drawings, forming a part thereof.

The main objects of this invention are to facilitate the construction and assemblage of the component parts of an armature and to provide for thorough ventilation of the core and windings.

It consists in certain novel features of construction and in the arrangement and combinations of parts, hereinafter particularly described, and pointed out in the claims.

In the accompanying drawings like letters designate the same parts in the several figures.

Figure 1 is an end elevation, certain parts being broken away and shown in section, of an armature embodying my improvements. Fig. 2 is a longitudinal section on the line 2 2, Fig. 1; and Figs. 3 and 4 are detailed views of the adjoining ends of segments of a spacing-ring, Fig. 3 being an end view and Fig. 4 an edge or face view.

$a$ is the hub or sleeve, which is fitted and adapted to be secured by a key or other means on the armature-shaft. It is preferably reduced in diameter at or near the ends and formed with shoulders $b$.

$c$ is an annular core composed of sheet iron or steel laminæ arranged in layers or groups, which are separated from each other by spacing-rings $d$ to form ventilating-spaces or air-passages $e$ from the inside to the outside of the core. The laminæ of which the core is composed are preferably made in segments, which are arranged to break joints with each other in the usual way, as shown in Fig. 1. The segments of the laminæ are formed inside with dovetailed or undercut notches which when the laminæ are assembled produce corresponding longitudinal grooves inside of the core parallel with the axes of the armature.

$f f$ are flanges fitted on the hub or sleeve $a$ against its shoulders $b$ and secured thereon by keys or other means. These flanges are made to extend over and embrace the ends of the core and are formed on their inner faces with radiating grooves or air-passages $g$.

$h h$ are dovetailed keys fitted to engage the grooves in the laminæ core and formed with reduced threaded ends, which are secured by nuts $i$ in the flanges $f$, the shoulders next to the reduced ends of the keys abutting against the inner faces of the flanges. The core is thus clamped between the flanges. The segments of the laminæ are held in place by the keys against displacement by centrifugal force, and the parts of the armature are securely bound together, leaving a clear space between the hub and the core for the passage of air through openings $j$ in the flanges to the ventilating-spaces $e$ and $g$ through and out the ends of the core.

To facilitate the construction and assemblage of the parts of the armature, the spacing-rings $d$ are made in segments connected at the ends by dovetailed tongues and tenons, as shown in Figs. 1 and 3, and each composed of radiating bars $k$, connected by a thin arc-shaped band $l$.

In building up the laminæ core one of the flanges, with the keys $h$ secured therein, is placed in a horizontal position, with the keys projecting upwardly, and the laminæ for the several layers of the core are dropped into place in engagement with the keys, which are securely held by the shoulders and nuts on their lower ends in their proper positions perpendicular to the flange, thereby greatly facilitating placing the notched segments of the laminæ thereon. Between adjacent layers of laminæ or sections of the core a spacing-ring is assembled by simply engaging with each other the grooved and tenoned ends of its component segments as the core is built up. Each ring is held in place between the several groups or layers of the laminæ concentric with the axis of the armature by the flanges and keys, which bind the parts together.

To accelerate the outward current of air through the ventilating-spaces in and at the ends of the core, fan-blades or vanes are arranged lengthwise of the armature between the core and hub. These blades or vanes, which are made of spring sheet metal or flexible material, are attached at their outer edges to some of the keys $h$ and are engaged at their inner edges by notches or lugs on a collar $n$, which is fitted to turn on the hub $a$ and is adjustably connected therewith by a screw $o$ engaging a nut held between lugs on the hub $a$. By means of this collar and its adjustable connection with a hub the curvature of the fan-blades or vanes may be reversed or adjusted to secure their most effective operation. This provision for reversing the fan-blades or vanes will be found convenient and advantageous, because it is necessary or desirable under certain conditions to turn the armature in one direction and under other conditions to turn it in the other direction, and it is not generally known or easily ascertained when the machine is made in what direction the armature will be run.

Various changes in the minor details of construction and arrangement of parts may be made within the spirit and intended scope of the invention.

I claim—

1. In an armature the combination of an annular laminated core having dovetailed longitudinal grooves inside, a central hub or sleeve, flanges mounted on said hub or sleeve and embracing the ends of the core and dovetailed keys secured at the ends in said flanges in engagement with the grooves in said armature and binding the parts together, substantially as described.

2. In an armature the combination of an annular laminated core having dovetailed longitudinal grooves inside, a hub or sleeve, flanges mounted on said hub or sleeve and embracing the ends of the core, and dovetailed keys fitted in engagement with the grooves in said core and reduced and threaded at the ends, which are secured by nuts in said flanges, the shoulders at the inner ends of the reduced portions of the keys abutting against the inner sides of the flanges, substantially as described.

3. In an armature the combination of an annular laminated core having ventilating-spaces between groups or layers of laminæ, a central hub or sleeve, flanges connecting the ends of the core with said hub or sleeve and formed with air-intake openings between the core and hub or sleeve, and reversible vanes arranged lengthwise of the armature between the core and central hub or sleeve and between said flanges, substantially as described.

4. In an armature the combination with a laminated core of spacing-rings interposed between groups or layers of laminæ, each spacing-ring being composed of segments provided at the ends with interlocking grooves and tenons, substantially as described.

5. In an armature the combination with a laminated core, of spacing-rings interposed between groups or layers of laminæ and each composed of segments connected with each other at their ends by dovetailed grooves and tenons and each segment consisting of radiating bars connected by a thin arc-shaped band, substantially as described.

6. In an armature the combination of an annular laminated core having undercut longitudinal grooves inside and ventilating-spaces at intervals between groups or layers of laminæ, a central hub or sleeve, flanges clamped on said hub or sleeve to the ends of said core by keys engaging the grooves in said core, flexible vanes attached at their outer edges to some of said keys, and means for bending said vanes toward their inner edges in either direction, substantially as described.

7. In an armature the combination of an annular laminated core having ventilating-spaces between the several groups or layers of laminæ of which it is composed, a central hub or sleeve, flanges clamped on said hub or sleeve to the ends of the core by keys which engage undercut grooves in the inner side of the core, flexible vanes attached at their outer edges to some of said keys, a collar mounted and capable of turning on said hub or sleeve and engaging the inner edges of said vanes, and means for adjusting said collar circumferentially on said hub or sleeve and thereby reversing the curvature of said vanes, substantially as described.

In witness whereof I hereto affix my signature in presence of two witnesses.

CHARLES D. KNIGHT.

Witnesses:
JOHN H. HURLEY,
ALICE E. GOSS.